US010453178B2

United States Patent
Isler et al.

(10) Patent No.: US 10,453,178 B2
(45) Date of Patent: Oct. 22, 2019

(54) LARGE SCALE IMAGE MOSAIC CONSTRUCTION FOR AGRICULTURAL APPLICATIONS

(71) Applicant: Regents of the University of Minnesota, Minneapolis, MN (US)

(72) Inventors: Ibrahim Volkan Isler, Minneapolis, MN (US); Zhengqi Li, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 6 days.

(21) Appl. No.: 15/415,347

(22) Filed: Jan. 25, 2017

(65) Prior Publication Data

US 2018/0114293 A1 Apr. 26, 2018

Related U.S. Application Data

(60) Provisional application No. 62/287,192, filed on Jan. 26, 2016.

(51) Int. Cl.
| | |
|---|---|
| *G06K 9/00* | (2006.01) |
| *G06T 3/40* | (2006.01) |
| *G06T 3/00* | (2006.01) |
| *G06T 7/73* | (2017.01) |
| *B64D 47/08* | (2006.01) |

(Continued)

(52) U.S. Cl.
CPC ............ *G06T 3/4038* (2013.01); *B64D 47/08* (2013.01); *G06K 9/00657* (2013.01); *G06T 3/0093* (2013.01); *G06T 7/579* (2017.01); *G06T 7/73* (2017.01); *B64C 39/024* (2013.01); *B64C 2201/123* (2013.01); *G06T 2200/32* (2013.01); *G06T 2207/10032* (2013.01); *G06T 2207/20021* (2013.01); *G06T 2207/20221* (2013.01); *G06T 2207/30188* (2013.01); *G06T 2207/30244* (2013.01)

(58) Field of Classification Search
CPC .......... B64C 2201/123; G06K 9/00657; G06T 2200/32; G06T 2207/10032; G06T 2207/20021; G06T 2207/20221; G06T 2207/30188; G06T 2207/30244; G06T 3/0093; G06T 3/4038; G06T 7/73
See application file for complete search history.

(56) References Cited

U.S. PATENT DOCUMENTS

| | | | | |
|---|---|---|---|---|
| 8,723,953 | B2 * | 5/2014 | Klomp | ...................... H04N 7/18 348/144 |
| 9,135,505 | B2 * | 9/2015 | Padwick | .................. G06T 11/00 |
| 2015/0022656 | A1 * | 1/2015 | Carr | ...................... G06K 9/0063 348/117 |

OTHER PUBLICATIONS

Zhengqi Li and Volkan Isler: "Large Scale Image Mosaic Construction for Agricultural Applications", Jan. 2016, IEEE Robatics and Automation Letters, vol. 1, No. 1, pp. 295-302.*

(Continued)

*Primary Examiner* — Siamak Harandi
(74) *Attorney, Agent, or Firm* — Westman, Champlin & Koehler, P.A.; Theodore M. Magee (57) ABSTRACT

A method for generating improved image mosaics includes using a set of overlapping images of a landscape to determine three-dimensional locations for a plurality of features of the landscape. Based on the three-dimensional locations of the plurality of features, a three-dimensional plane of interest is determined. The overlapping images are warped onto the plane of interest to form a mosaic of images.

17 Claims, 11 Drawing Sheets

(51) Int. Cl.
G06T 7/579 (2017.01)
B64C 39/02 (2006.01)

(56) References Cited

OTHER PUBLICATIONS

Changki Min, Qian Yu, and Gerard Medioni: "Multi-layer Mosaics in the Presence of Motion and Depth Effects", 2006, IEEE, Proceedings of the 18th International Conference on Pattern Recognition.*
David Liebowitz and Andrew Zisserman, "Metric Rectification for Perspective Images of Planes", Jun. 25, 1998, IEEE Computer Society Conference on Computer Vision and Pattern Recognition.*
Botterill et al., Real-time aerial image mosaicing, 25th International Conference on Image and Vision Computing New Zealand (IVCNZ), 2010, IEEE, pp. 1-8.
Brown et al, Recognising Panoramas, in Proceedings of the 9th International Conference on Computer Vision, vol. 2, Nice, Oct. 2003, pp. 1218-1225.
Brown et al., Automatic Panoramic Image Stitching using Invariant Features, International Journal of Computer Vision, vol. 74, No. 1, pp. 59-73, 2007.
Elibol et al., A new global alignment method for feature based image mosaicing, in Advances in Visual Computer, Sprinter, 2008, pp. 257-266.
Elibol et al., A new global alignment approach for underwater optical mapping, Ocean Engineering, vol. 38, pp. 1207-1219, 2011.
Ferrer et al., Large-area photo-mosaics using global alignment and navigation data, in MTS/IEEE Oceans Conference, Vancouver, Canada, 2007, pp. 1-9.
Fusiello et al., Mosaic of a video shot with multiple moving objects, International Conference on Image Processing, ICIP, vol. 2, IEEE, 2003, pp. II-307.
Gracias et al., Underwater video mosaics as visual navigation maps, Computer Vision and Image Understanding, vol. 79, pp. 66-91, 2000.
Gracias et al., Underwater mosaicing and trajectory reconstruction using global alignment, in Oceans, MTS/IEEE Conference and Exhibition, vol. 4, IEEE, 2001, pp. 2557-2563.
Gracias et al., Linear global mosaics for underwater surveying, 5th IFAC Symposium on Intelligent Autonomous Vehicles,, vol. 1, 2004.
Gracias et al., Underwater mosaic creation using video sequences from different altitudes, in Oceans, Proceedings of MTS/IEEE, IEEE, 2005, pp. 1295-1300.
Kang et al., A graphic-based Global registration for 2D mosaics, 15th International Conference on Pattern Recognition, vol. 1, IEEE, 2000, pp. 257-260.
Kim et al., Pose-graph visual SLAM with geometric modeling selection for autonomous underwater ship hull inspection, IEEE/RSJ International Conference on Intelligent Robots and Systems, IROS, IEEE, 2009, pp. 1559-1565.
Lin et al., Map-enhanced UAV image sequence registration and synchronization of multiple image sequences, in IEEE Conference on Computer Vision and Pattern Recognition, IEEE, CVPR 2007, pp. 1-7.
Lowe, Districtive image features from scale-invariant keypoints, International Journal of Computer Vision, vol. 60, No. 2, pp. 91-110, 2004.
Ma et al., An invitation to 3-D vision from images to models, Springer Science & Business Media, 2012, vol. 26, 338 pages.
Marburg et al., SMARTPIG: Stimulation mosaicking and resectioning through planar image graphs, IEEE International Conference on Robotics and Automation (ICRA), 2015, pp. 5767-5774.
Autostitch, http://matthewalunbrown.com/autostitch/autostitch.html, accessed Sep. 2016.
Moulon et al., Global fusion of relative motions for robust, accurate and scalable structure from motion, in IEEE International Conference on Computer Vision (ICCV), IEEE, 2013, pp. 3248-3255.
Pfingsthorn et al., Maximum likelihood mapping with spectral image registration, in Robotics and Automation (ICRA), IEEE International Conference on Robotics and Automation (ICRA), IEEE, 2010, pp. 4282-4287.
Microsoft research image composite editor, http://research.microsoft.com/en-us/um/redmond/projects/ice, accessed Sep. 2016.
Steder et al., Visual SLAM for flying vehicles, IEEE Transactions on Robotics, vol. 24, No. 5, pp. 1088-1093, 2008.
Steedly, Efficiently registering video into panoramic mosaics, Tenth IEEE International Conference on Computer Vision, vol. 2, pp. 1300-1307, 2005.
Szeliski, Image alignment and stitching: a tutorial, Foundations and trends in computer graphics and vision, vol. 2, No. 1, pp. 1-104, 2006.
Szeliski, Computer vision: algorithms and applications, Springer Science & Business, Media, 2010.
Triggs et al., Bundle Adjustment—A Modern Synthesis, in Vision algorithms: theory and practice, Springer, 2000, pp. 298-372.
Wu et al., Multicore bundle adjustment, IEEE Conference on Computer Vision and Pattern Recognition (CVPR), IEEE, 2011, pp. 3057-3064.
Kolor autopano, http://www.kolor.com/autopano/, accessed Sep. 30, 2016.

* cited by examiner

LARGE SCALE IMAGE MOSAIC CONSTRUCTION FOR AGRICULTURAL APPLICATIONS

CROSS-REFERENCE TO RELATED APPLICATION

The present application is based on and claims the benefit of U.S. provisional patent application Ser. No. 62/287,192, filed Jan. 26, 2016, the content of which is hereby incorporated by reference in its entirety.

This invention was made with government support under 1317788 and 1111638 awarded by the National Science Foundation (NSF). The government has certain rights in the invention.

BACKGROUND

One of the driving forces behind the proliferation of commercial Unmanned Aerial Vehicles (UAVs) is their applications in agriculture. In particular, obtaining frequent aerial images of their farms allow the farmers to make informed decisions related to fertilizer application, irrigation, pesticide application and other farm practices. In a typical application, a UAV equipped with (often multispectral) cameras is flown over the field. The images are geo-tagged and a mosaic is built to inform farm decisions.

SUMMARY

A method for generating improved image mosaics includes using a set of overlapping images of a landscape to determine three-dimensional locations for a plurality of features of the landscape. Based on the three-dimensional locations of the plurality of features, a three-dimensional plane of interest is determined. The overlapping images are warped onto the plane of interest to form a mosaic of images.

An agricultural image system includes an unmanned aerial vehicle having mounted thereon a camera configured to capture a set of captured images of a geographical area. A processor forms a mosaic from the set of captured images through steps that include selecting a subset of the set of captured images and using the subset of images to identify geographical features of the geographical area. A plane is then selected based on the geographical features. The subset of images is warped onto the selected plane to form a mosaic.

A method of constructing a mosaic includes identifying initial images for a mosaic to define a geographical area covered by the mosaic. The geographical area is divided into block areas and for each block area, a plurality of images that contain pixels covering the block area are identified. Each image in the plurality of images is then evaluated and one of the plurality of images is selected as the image for the block area based on the evaluations.

DETAILED DESCRIPTION OF ILLUSTRATIVE EMBODIMENTS

The embodiments described below provide novel techniques for stitching images including those obtained from aerial vehicles flying at low altitudes. Existing image stitching/mosaicking methods rely on inter-image homography computations based on a planar scene assumption that assumes that any two images can be aligned with each other using homography and lateral translations. To enforce this assumption in practice, UAVs are typically flown at high altitudes. This way, depth variation due to objects such as trees becomes negligible. Since scale and resolution changes can introduce errors in mosaic computation, the UAV motion is constrained so that it flies at a fixed altitude with the camera plane essentially parallel to the ground. Violation of these assumptions results in misalignment, perspective distortion or even complete failure in mosaic generation.

However, there are many reasons, including regulations, safety and privacy concerns, to avoid flying at high-altitudes. From a technical perspective, flying high can cause loss of resolution and many smaller UAVs do not have the robustness and payload capacity to fly at high altitudes.

The embodiments described below remove these limitations and perform well even when aerial images are taken from low altitudes by an aerial vehicle performing complex motions. One embodiment starts by extracting the ground geometry from a sparse reconstruction of the scene obtained from a small fraction of the input images. Next, the embodiment selects the best image (from the entire sequence) for each location on the ground using a novel camera selection criterion. This image is then independently rectified to obtain the corresponding portion of the mosaic. Therefore, the technique avoids performing costly joint-optimization over the entire sequence. In the results discussed below, the embodiment is validated using challenging input sequences motivated by agricultural applications.

In a sense, the approach of the present embodiments falls between a SfM-based full reconstruction and standard mosaic generation. On the one hand, performing SfM over the entire input sequence would be prohibitively costly in terms of computation time and would yield only a sparse reconstruction of the scene. On the other, homography-based mosaic construction is prone to an accumulation of errors. Joint optimization methods such as bundle adjustment to avoid error accumulation would again be prohibitively costly making use of the entire sequence infeasible. Discarding images to reduce the input size would yield significant loss of resolution especially if wide-angle lenses (e.g. a fish eye camera) are used to obtain images. The approach of the present embodiments circumvents these difficulties by choosing the best view across the entire sequence and independently warping it to a carefully chosen world frame. As we show below, the performance of the various embodiments is superior to state-of-the art mosaicking software.

The present embodiments are different from the existing body of work in a number of significant ways. First, the present embodiments can accommodate a large number of images because the joint optimization required for estimating the world structure in a robust fashion is performed on a very small fraction of the images (about 2% in some cases). However, all images in the input sequence are utilized. Second, the embodiments provide a novel method to choose a best image for each ground patch. Experiment results indicate that this view selection reduces misalignment and improves resolution. Explicitly reconstructing the ground geometry allows the embodiments to find a canonical rectification for each image.

Figure 1:
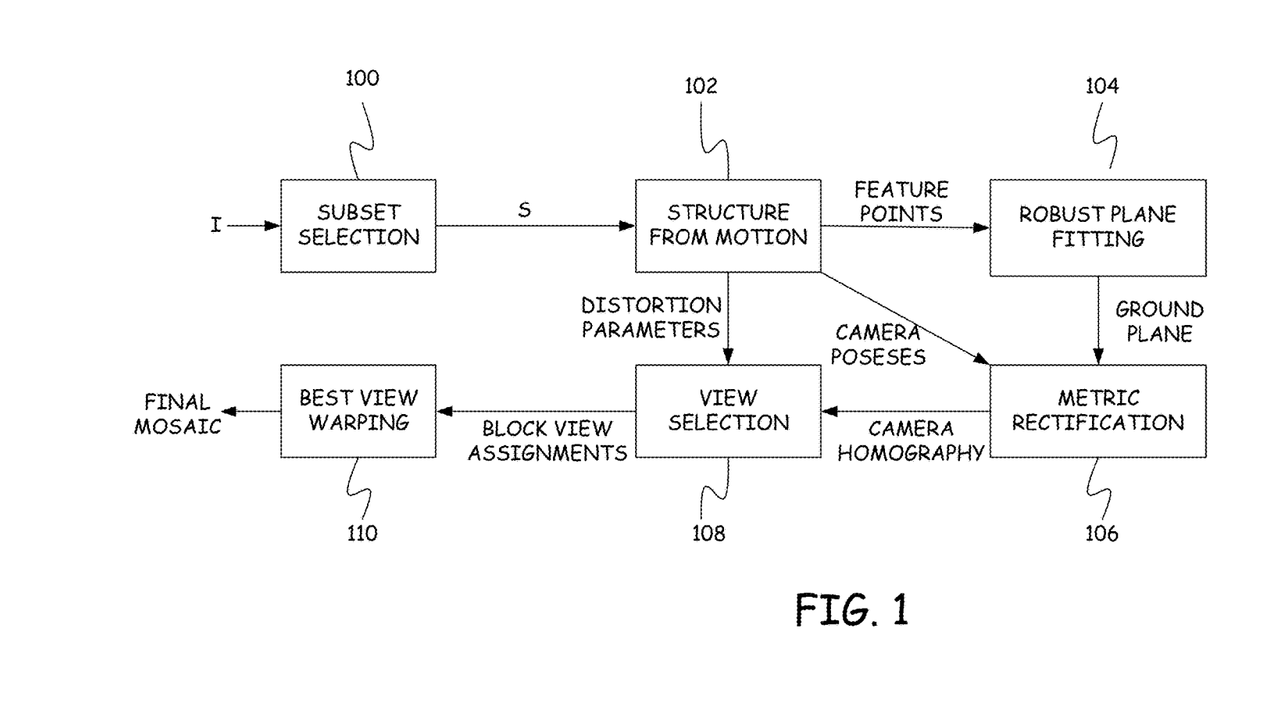
FIG. 1 provides a method of forming a mosaic in accordance with some embodiments.

FIG. 1 provides a flow diagram of a method of forming a mosaic image in accordance with one embodiment. In step 100, a large set of images I is received and from that large set, a small portion S⊆I is chosen and input to a standard Structure from Motion (SfM) algorithm 102 to obtain a sparse ground reconstruction and camera poses for each image in S. In step 104, a ground plane P is estimated using a robust plane fitting algorithm. In step 106, each image in S is rectified using the ground plane P and the camera poses K for each image and computing a homography which corresponds to rotating each camera pose in place so as to make the image plane parallel to the ground. At this stage, the size of the final mosaic is determined. In step 108, the embodiment divides the final mosaic into blocks and identifies a best image in S for each block using an innovative technique described below. At step 110, the selected images are warped onto the corresponding blocks on the ground plane P so as to create a high resolution mosaic. The details of each of these steps are presented below.

Estimating Ground Geometry

Let I=$I_1, \ldots, I_n$ be the input sequence. In step 100, a small subset S⊆I with sufficient overlap between the images of S is chosen. For example, for an Unmanned Aerial Vehicle (UAV) moving straight at 1 m/s and recording images at 30 fps with a per image footprint of only 10 meters, the UAV moves 2 meters in 2 seconds and therefore ⅘ of image $I_i$ would overlap with image $I_{i+2\times30-1}=I_{i+59}$. Therefore, keeping around 2% of I by picking every 50th frame would safely yield sufficient overlap.

At step 102, the images in S are input to a robust Structure from Motion (SfM) pipeline based on Bundle Adjustment such as the Structure from Motion described in B. Triggs, P. F. McLauchlan, R. I. Hartley, and A. W. Fitzgibbon, "Bundle adjustment a modern synthesis," in *Vision algorithms: theory and practice*. Springer, 2000, pp. 298-372, for example. This produces globally optimal camera poses as well as 3D locations of robust features such as SIFT (described in D. G. Lowe, "Distinctive image features from scale-invariant key-points," *International journal of computer vision*, vol. 60, no. 2, pp. 91-110, 2004). In one particular embodiment, the Visual SfM tool is used as discussed in P. Moulon, P. Monasse, and R. Marlet, "Global fusion of relative motions for robust, accurate and scalable structure from motion," in *Computer Vision (ICCV)*, 2013 IEEE International Conference on. IEEE, 2013, pp. 3248-3255, and C. Wu, S. Agarwal, B. Curless, and S. M. Seitz, "Multicore bundle adjustment," in *Computer Vision and Pattern Recognition (CVPR)*, 2011 IEEE Conference on. IEEE, 2011, pp. 3057-3064. In addition to determining the camera poses and 3D features, camera intrinsics including distortion parameters can be estimated if not already available.

Figure 2:
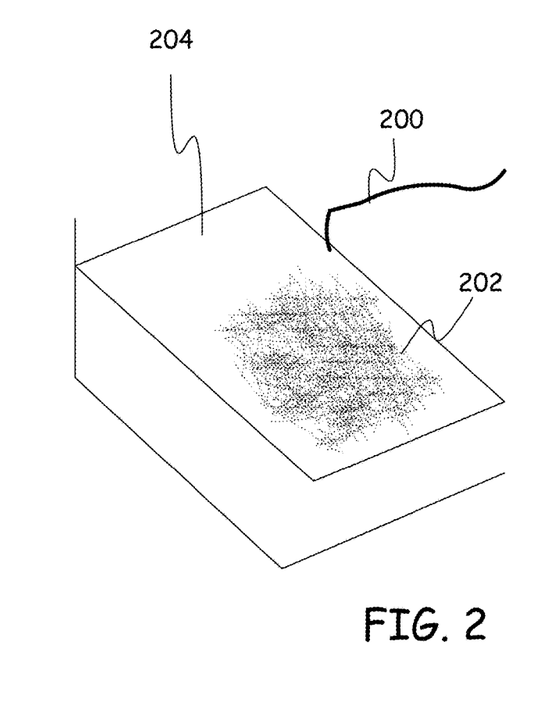
FIG. 2 provides a depiction of image capture locations, identified feature points and a fitted plane for a corn field dataset.
Figure 3:
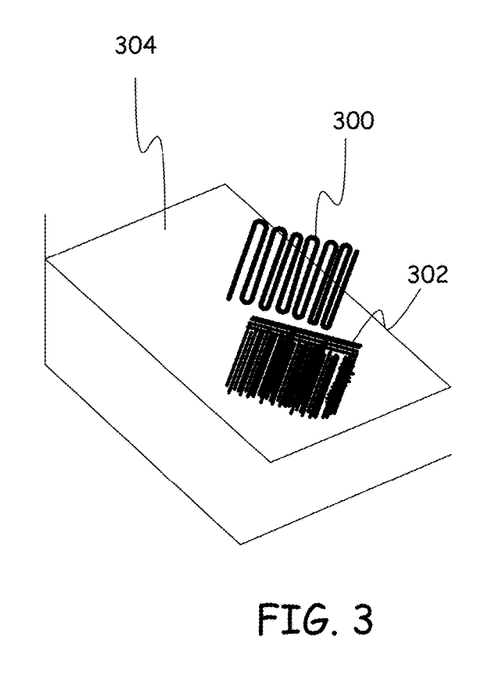
FIG. 3 provides a depiction of image capture locations, identified feature points and a fitted plane for an orchard dataset.

FIGS. 2 and 3 show sequences of image capture locations 200 and 300, over respective fields and the corresponding set of 3D locations 202 and 302, determined from the images in step 102.

In some embodiments, the output of step 102 is examined to determine if the SfM failed because the scene was too planar. If the SfM failed, automatic model selection methods, such as the one used in A. Kim and R. Eustice, "Pose-graph visual slam with geometric model selection for autonomous underwater ship hull inspection," in *Intelligent Robots and Systems, 2009. IROS 2009. IEEE/RSJ International Conference on*. IEEE, 2009, pp. 1559-1565, are used. In other embodiments, the output of SfM step 102 is examined to determine if image selection step 100 can be improved. In particular, if the speed or pose of the UAV is highly varying, the output of SfM is investigated to adjust the selection of S by adaptively choosing key frames in I based on the amount of overlap for image pairs similar to the keyframe method presented in D. Steedly, C. Pal, and R. Szeliski, "Efficiently registering video into panoramic mosaics," in *Computer Vision, 2005. ICCV 2005. Tenth IEEE International Conference on*, vol. 2. IEEE, 2005, pp. 1300-1307.

Ground Plane Estimation

When flying at low altitudes, the planar scene assumption can fail locally. Further, objects such as trees which cause height variations are good sources of robust features and therefore they are frequently picked up for homography estimation. As a result, homographies obtained directly from the images can be inconsistent across the sequence. In particular, when the normal vector of the ground plane is directly estimated from a single homography, if the deviation from the true ground plane is large, it can cause significant perspective distortion in the mosaic.

The present embodiments avoid such errors for two reasons: (i) In step 102, the world geometry is estimated without making any planarity assumptions, and (ii) in step 104, the ground plane is directly and globally estimated using a robust plane fitting algorithm. In one particular embodiment, the ground plane is identified in step 104 by first using Random Sample Consensus (RANSAC) to fit a plane to the 3D feature points. During RANSAC the 3D feature points identified in step 102 are divided into inliers that are used to identify the ground plane, and outliers that are so far from an estimated plane that they are not used when fitting the plane to the 3D feature points. Typically, the outliers will include points associated with trees and other structures that are above the true ground plane. Principal Component Analysis (PCA) is then performed on the inliers with the first two major eigenvectors and the mean providing the world reference plane.

Figure 4:
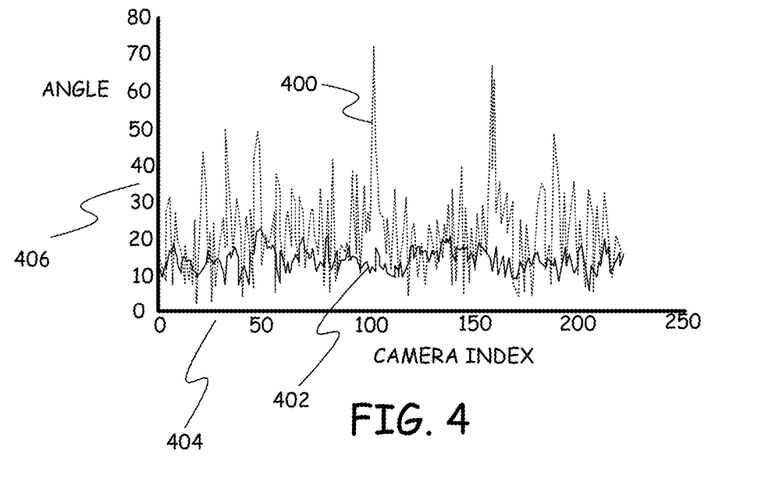
FIG. 4 provides graphs showing the angle between ground normal and the camera optical axis for inter-image homography and fitting a plane after SfM.

By identifying the ground plane using RANSAC and PCA on the 3D feature points instead of determining a ground normal vector using homography, the present embodiments reduce variations between the camera optical axis and the estimated ground normal. FIG. 4 provides a graph 400 (dotted) of the angle between camera optical axis and estimated ground normal when the ground normal is determined using homography and a graph 402 (solid) between camera optical axis and the normal to the ground plane estimated in step 104. In FIG. 4, the indices of the images is shown along horizontal axis 404 and the angle between the camera optical axis of the image and the normal to the ground plane is shown on vertical axis 406. The average difference between the two methods is 10.097 degrees with standard deviation of 9.470 degrees. As can be seen, the plane normal estimated from the homographies has a much larger variance relative to the optical axis than the plane normal estimated using the technique of the present embodiments.

Metric Rectification

Warping an image directly to another image can cause significant perspective distortion, especially if the camera motion includes rotations. The present embodiments avoid this distortion by using the ground plane P computed in step 104, which provides a canonical frame to warp the images to. When images are rectified with respect to P, perspective distortion and misalignment is significantly reduced. Thus, at step 106 the world coordinate frame w, given by the ground plane P estimated in step 104, and camera poses, K, for each image in the subsequence S are used to identify a translation $^{c_t}T_w$ and rotation $_w^{c_t}R$ for image warping from each camera frame $c_i$ to the world frame w.

Specifically, let t be the index of the camera to be rectified. Let $^wN$ be the unit normal vector of P. In camera coordinates, this vector is expressed as $$^{c_t}N = _w^{c_t}R\,^wN \qquad (1)$$

The rotation that aligns the optical axis of the camera with $^{c_t}N$ is given by a rotation around the axis $\hat{k} = ^{c_t}Z \times ^{c_t}N$ by an angle of $$\theta = \arccos\left(\frac{^{c_t}Z \cdot ^{c_t}N}{|^{c_t}Z||^{c_t}N|}\right).$$

The rotation matrix can be obtained by a standard angle-axis to matrix conversion procedure.

The homography which warps image i to the mosaic plane P' that is parallel to the ground plane P is given by:

$$^{P'}p = K\underbrace{\left(^{P'}_{c_i}R + ^{P'}T_{c_i}\frac{^{c_i}N^T}{^{c_i}d}\right)}_{H_{c_i-P'}}K^{-1}\,^{c_i}p \qquad (2)$$

where K is the camera calibration matrix; $^{P'}_{c_i}R$ and $^{P'}T_{c_i}$ are respectively the orientation and translation of camera $c_i$ with respect to P'; $^{c_i}N$ is unit normal vector with respect to camera $c_i$; $^{c_i}d$ distance between optical center of camera $c_i$ and ground plane with respect to world coordinate; $H_{c_i-P'}$ is the homography from camera $c_i$ to P'; and $^{P'}p$ and $^{c_i}p$ are the positions of feature points in image coordinates with respect to the mosaic plane and camera $c_i$, respectively. By rectifying each image in S onto the mosaic plane, the size of the final mosaic is determined as the area covered by the rectified images on the mosaic plane.

Automatic View Selection

The steps above have only used the images in the subsequence S. However, to improve resolution of the final mosaic, the present embodiments examine all of the images in the full image sequence I to identify a collection of images that will form the best mosaic. Let $c_i$ be the pose of an arbitrary image in I\ S and let $c_j$ be the camera pose computed in step 102 for the image with the nearest index in S. In a first step, the camera pose of each such $c_i$ is computed by computing the essential matrix between $c_i$ and $c_j$ and then extracting the relative pose of $c_i$ with respect to $c_j$. Since the pose of $c_j$ has already been computed with respect to the world frame (in a robust fashion in step 102), we can easily compute the pose of $c_i$ with respect to the world frame using the essential matrix.

When generating image mosaics, usually the images in the data set are warped to the mosaic in an arbitrary or sequential order. When a scene point (or patch) is visible from multiple viewpoints, the selection of the correct image to represent this area is crucial to maximize resolution and to minimize distortion. This is especially true for cameras with large lens distortion or UAV motions including tilting of the camera and motion at different altitudes. Such images can induce visible misalignment and poor resolution in the final mosaic. To overcome this, the present embodiments apply a view-selection step described below.

First, the mosaic (whose size was determined in step 106) is partitioned into square blocks of size n×n. In theory, the block size can be chosen arbitrarily small. However this would adversely affect the running time of the algorithm. In practice, its choice depends on the size of the mosaic and individual camera poses. For one embodiment, to generate a mosaic of size 2500×3000 pixels, a block size of 100×100 is used. When projected to the original images, each block corresponded to a window area in the original image that ranged from 6% to 21% of the image area. For each block b, let T (b) be the list of images that capture the entire block. That is, image I is in T(b) if and only if the projection of all four corners of b lie in I.

In order to pick the best image for block b, one embodiment chooses the best view using a novel metric given by the number of pixels dedicated to b in an image normalized by the distortion in these pixels. The quality measure assigned to image I∈T(b) for block b is given by $$Q_b(I) = \sum_{p \in I} w_p \rho_p \quad (3)$$

where the summation is over the pixel indices $p=[x\ y]^T$ and $\rho_p$ is an indicator variable which is 1 if and only if p is the projection of a point in block b. The distortion weight $w_p$ is computed using a distortion model. We use the following standard model:

$$x_{offset} = f_x(x_n(1+k_1r^2+k_2r^4+k_3r^6)) \quad (4)$$

$$y_{offset} = f_y(y_n(1+k_1r^2+k_2r^4+k_3r^6)) \quad (5)$$

where $x_{offset}$ and $y_{offset}$ are the displacements in x and y directions measured in pixels. $x_n$ and $y_n$ are the coordinates of the pixel p in normalized image plane before distortion correction and r is distance between the pixel and principal point in normalized image plane before correction.

Figure 5:
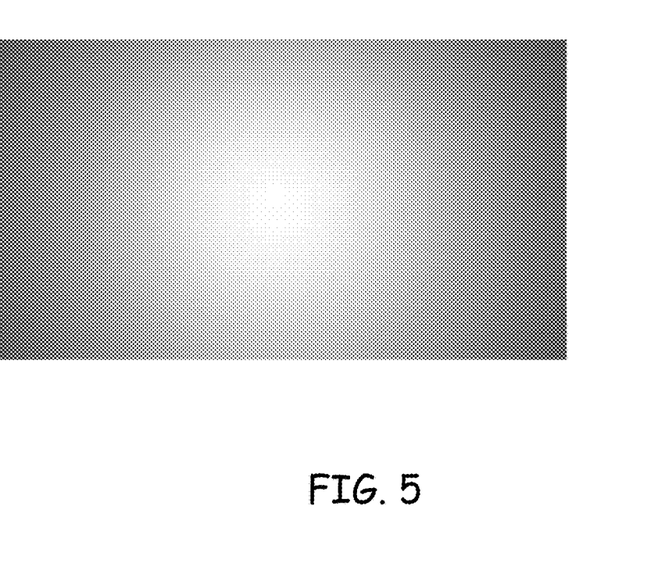
FIG. 5 depicts an image kernel based on a standard lens distortion model.

Based on the lens distortion model, we generate a weight kernel whose size is the same as original image size and for each pixel p it is defined as below:

$$w(p) = \exp\left(-\frac{d(p)}{d_{max}}\right) \quad (6)$$

where w(p) is weight for each pixel at position p and $d(p) = \sqrt{x_{offset}^2 + y_{offset}^2}$; $d_{max}$ is the largest corrected displacement for all the pixels in image. Thus, the weight kernel is radially based as shown in FIG. 5, where darker areas represent greater distortion.

The proposed view selection algorithm is given in Algorithm 1 below.

ALGORITHM 1

```
Input: block b= 1~N in mosaic, image sequence j=1~M, homography
       from mosaic plane
       to the image H_{p'-c_j}, image distortion coefficients k_1, k_2,
       k_3, block visible vector
       T(b)
Out-   Mosaic (with best view selection)
put:
for b ← 1 to N do
    for j ← 1 to M do
        if projection of 4 corners of block b are all within
        image j then
          add image index j to T(b)
        end
    end
end
for b ← 1 to N do
    maxQ = -1;
    if T(b) is empty then
        continue
    end
    for camera j ∈ T(b) do
        Warp pixels within block b to image j using
        H_{p'-c_j}
        Compute Q_b(I ) = Σ_{p∈I} w_p ρ_p  (Equation 3)
        if Q_b(I) > maxQ then
           maxQ = Q_b(I)
           optimalIndex = j
        end
    end
    Warp the portion of image with index optimalIn-
    dex that belongs to
    block i to the corresponding block i in the final mosaic
end
```

Results

In this section, two sets of results are presented that show the effectiveness of the various embodiments. The first set are quantitative results based on reprojection errors that compare the present embodiments to a standard stitching approach. The second set of results are qualitative results that compare resulting mosaics formed using the present embodiments and commercially available software.

A. Quantitative Evaluation

In the first results, the present embodiments are compared with a "baseline" approach which, given an input sequence, chooses the middle frame $I_m$ as reference and warps all frames onto $I_m$ using inter-homography derived from SIFT correspondences. This method is compared with the output of the present embodiments before and after the view selection steps.

The results use two image sequences referred to as "orchard" and "corn field." The orchard dataset contains images of UMN Horticulture Field Station taken from a UAV flying at around 13 m altitude and at approximately constant speed of 1 m/s (FIG. 3). The area covered is about 2200 m². The camera mounted on the UAV was GoPro Hero 3 whose intrinsics are available on the accompanying website. The video was recorded as an MP4 file at 29 fps at 1920×1080 resolution. Every fifth frame from the video is selected in step 100 of FIG. 1 to generate an image sequence with 3500 images. In the corn field dataset, the images are collected from a UAV exhibiting a complex motion: First, the UAV flies at low altitude (around 5 m) and then it lifts up to about 25 m (FIG. 2). In this data set, the high flying speed causes motion blur in the middle section of the video. Again, every fifth frame is selected in step 100 of FIG. 1 to generate an image sequence with 540 images. Camera parameters were unknown.

To evaluate the algorithms, histograms of reprojection errors are generated using the same set of SIFT features for 3 different methods. For all methods, each inlier 3D point P from SfM (i.e. the point above the ground and within final mosaic) is projected onto ground plane P to obtain the 2D feature '. For the baseline method, each 2D feature P' on the ground plane is transformed to the coordinates of reference mosaic $I_m$ with the same scale based on camera poses. Then, each feature in $I_m$ is projected back to the original image, i, based on homography computed from baseline method and the root mean squared reprojection error (RMSRE) is estimated for each feature P given by:

$$\sqrt{\frac{1}{N}\sum_{i=1}^{N} \|T^i(P) - p_i\|^2},$$

where $T^i$ is the transformation from 3D space to the coordinate of original image i of the feature P.

For the present embodiment without view selection, after obtaining 2D feature P', we project 2D feature P' from ground plane P back to all the images that include 2D feature P' in the sequential warping sequence using the camera poses from SfM. Finally, we compute RMSRE for each 2D feature P' using the original position of each feature in each image. For the embodiment with view selection, every feature 2D feature P' is projected back to only the image chosen after best view selection.

Figure 6A:
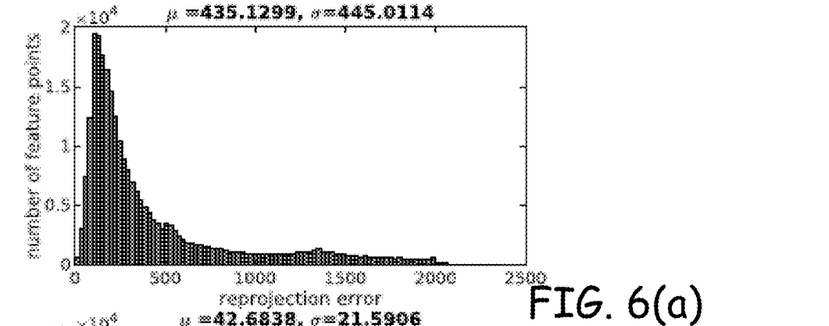
FIGS. 6(a), 6(b), and 6(c) provide histograms of reprojection errors on the orchard dataset for the prior art baseline method, for a present embodiment without view selection, and for a present embodiment with view selection, respectively.
Figure 6B:
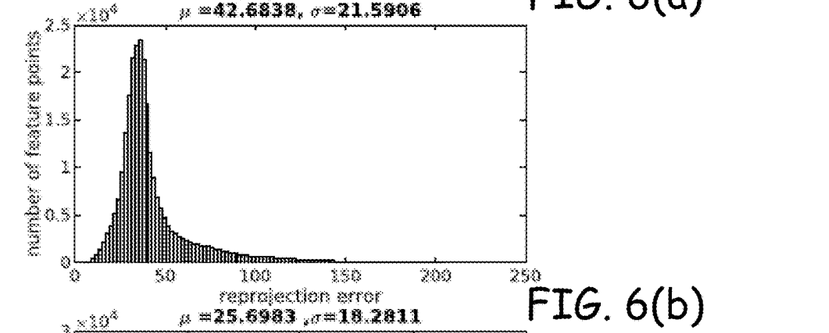
Figure 6C:
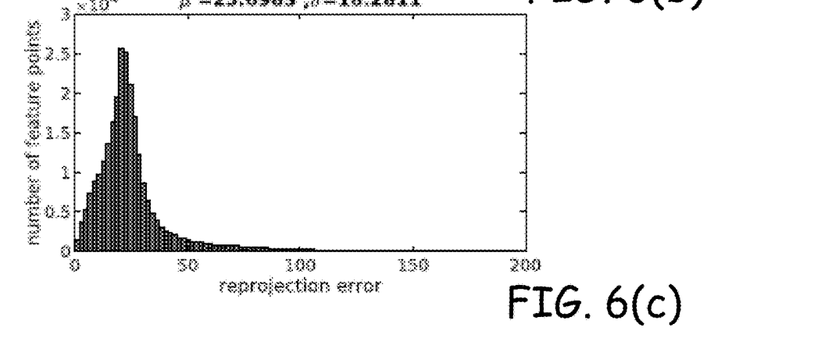
Figure 7A:
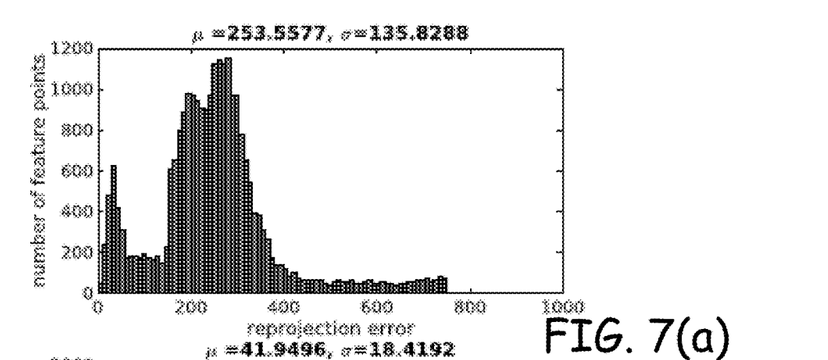
FIGS. 7(a), 7(b), and 7(c) provide histograms of reprojection errors on the corn field dataset for the prior art baseline method, a present embodiment without view selection, and for a present embodiment with view selection, respectively.
Figure 7B:
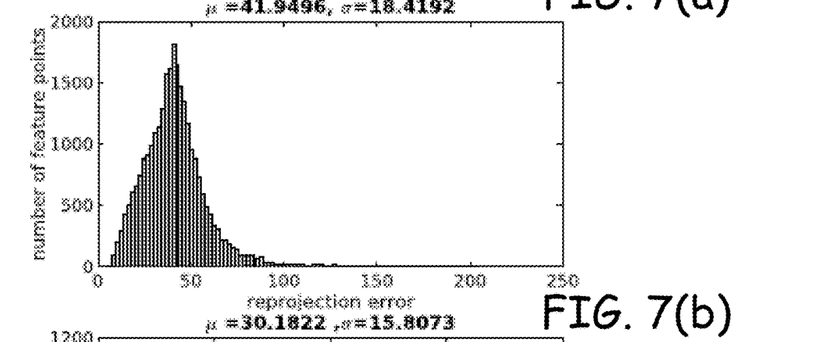
Figure 7C:
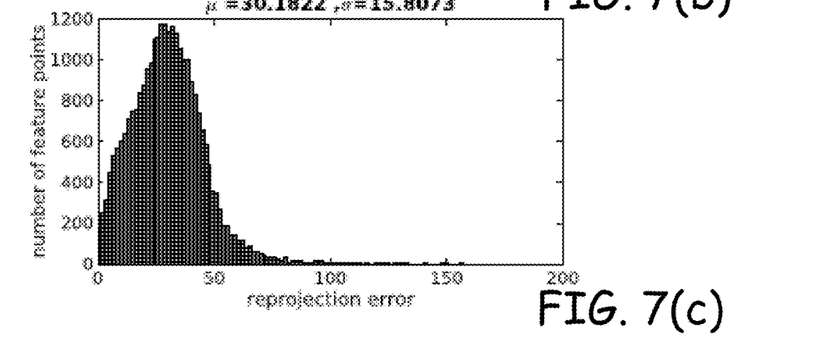

In one experiment, a total of 258182 inlier SIFT features were used to compute reprojection errors in the orchard dataset and a total of 27277 inlier SIFT features where used to compute reprojection errors in the corn field dataset. FIGS. 6(a), 6(b), and 6(c) show reprojection error histograms for the prior art baseline method, the present embodiment without view selection and the present embodiment with view selection, respectively, for the orchard dataset. FIGS. 7(a), 7(b), and 7(c) show reprojection error histograms for the prior art baseline method, the present embodiment without view selection and the present embodiment with view selection, respectively, for the corn field dataset. In FIGS. 6(a), 6(b), 6(c), 7(a), 7(b), and 7(c) the size of the reprojection errors is shown along the horizontal axis of each graph and the number of feature points with a particular reprojection error is shown along the vertical axis of each graph. Comparing FIG. 6(a) to FIGS. 6(b) and 6(c) it can be seen that the present embodiments have significantly smaller reprojection errors and that the embodiment with view selection has smaller reprojection errors than the embodiment without view selection for the orchard dataset. Similarly, comparing FIG. 7(a) to FIGS. 7(b) and 7(c) it can be seen that the present embodiments have significantly smaller reprojection errors and that the embodiment with view selection has smaller reprojection errors than the embodiment without view selection for the orchard dataset. The results indicate that (1) the present embodiments are a significant improvement over the baseline method and that (2) view selection reduces reprojection error.

B. Qualitative Evaluation

In this section, we compare the present embodiments that use view selection against Auto-Stitch ["Autostitch," http://matthewalunbrown.com/autostitch/autostitch.html.], Autopano ["Kolor autopano," http://www.kolor.com/autopano/.], Microsoft Image Composite Editor (ICE) [Microsoft research image composite editor," http://research.microsoft.com/en-us/um/redmond/projects/ice/], the baseline method and the present embodiment before view selection step 108.

Figure 8A:
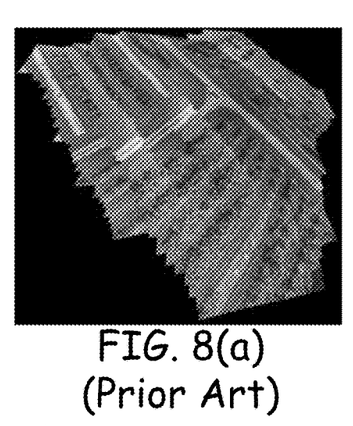
FIG. 8(a) is an example of a mosaic resulting from a prior art baseline method based on images from a first dataset.
Figure 8B:
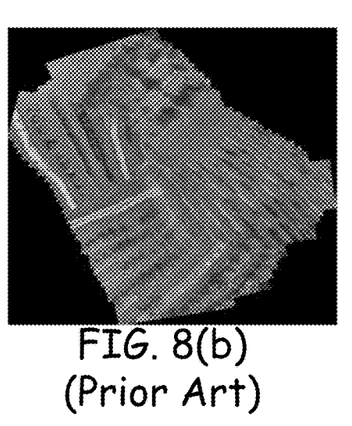
FIG. 8(b) is an example of a mosaic resulting from Auto-Stitch software based on the images in the dataset of FIG. 8(a).
Figure 8C:
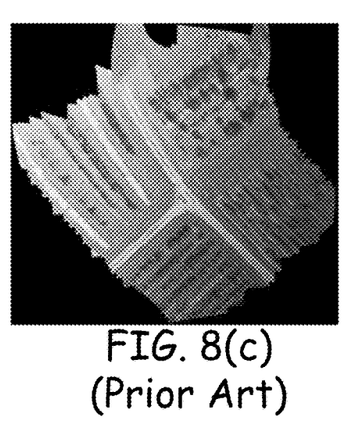
FIG. 8(c) is an example of a mosaic resulting from Autopano software based on the images in the dataset of FIG. 8(a).
Figure 8D:
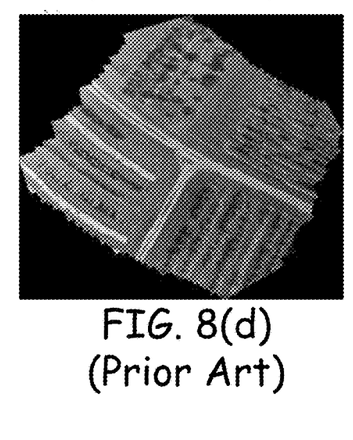
FIG. 8(d) is an example of a mosaic resulting from MicrosoftImage Composite Editor (ICE) based on the images in the dataset of FIG. 8(a).
Figure 8E:
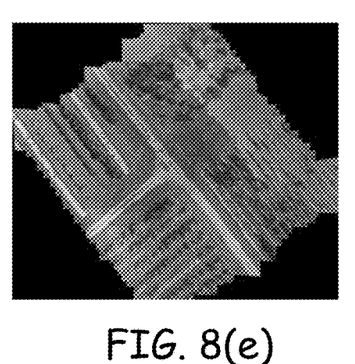
FIG. 8(e) is an example of a mosaic resulting from a present embodiment without view selection based on the images in the dataset of FIG. 8(a).
Figure 8F:
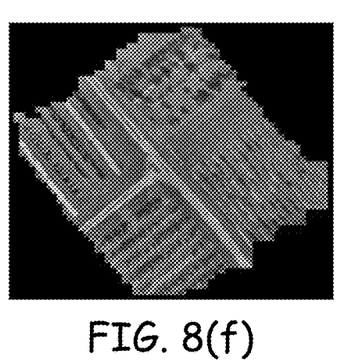
FIG. 8(f) is an example of a mosaic resulting from a present embodiment with view selection based on the images in the dataset of FIG. 8(a) and additional images in the first dataset.

FIGS. 8(a)-8(f) show a comparison of the mosaic results on the orchard data for these six methods. In particular, FIG. 8(a) shows the mosaic resulting from the prior art baseline method, FIG. 8(b) shows the mosaic resulting from Auto-Stitch, FIG. 8(c) shows the mosaic resulting from Autopano, FIG. 8(d) shows the mosaic resulting from Microsoft ICE, FIG. 8(e) shows the mosaic resulting from step 106 without perform view selection step 108, and FIG. 8(f) shows the mosaic resulting from step 110 with view selection and best warping. Out of the 3500 images in the sequence, 350 images (corresponding to an interval of 50 frames for the original video) were input to the Autopano, Auto-Stitch, and Microsoft ICE software. The same 350 images were used as input for the SfM, in the baseline method, the present embodiment without view selection and the present embodiment with view selection. The final result of the embodiment with view selection uses the additional 3150 images in view selection step 108. In FIGS. 8(a) and 8(b), generated by the prior art baseline method and Auto-Stitch, the mosaics have serious misalignment between the images used to form the mosaic as indicated by breaks in the roads and rows of trees. In FIGS. 8(c) and 8(d) generated by Autopano and Microsoft ICE, there is visible misalignment and a large amount of skewness as indicated by the curved nature of some of the rows. FIGS. 8(e) and 8(f) generated by the present embodiments remove misalignment and skewness, with FIG. 8(f) providing better resolution.

Figure 9A:
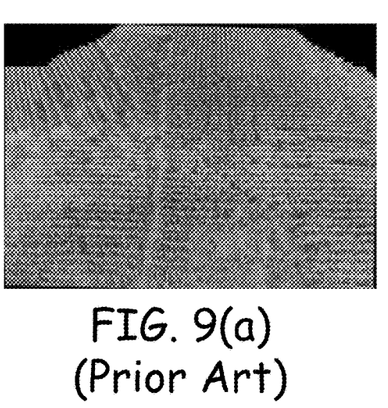
FIG. 9(a) is an example of a mosaic resulting from a prior art baseline method based on images from a second dataset.
Figure 9B:
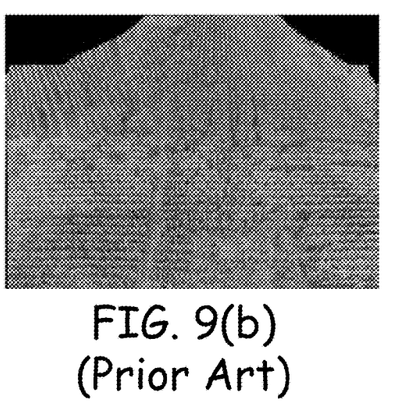
FIG. 9(b) is an example of a mosaic resulting from Auto-Stitch software based on the images in the dataset of FIG. 9(a).
Figure 9C:
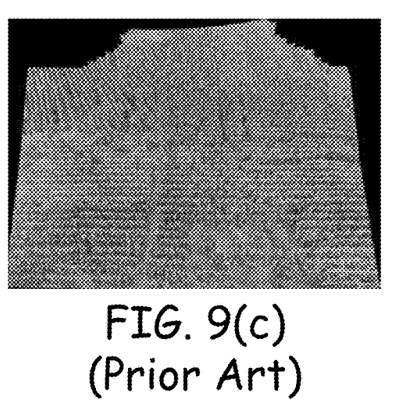
FIG. 9(c) is an example of a mosaic resulting from Autopano software based on the images in the dataset of FIG. 9(a).
Figure 9D:
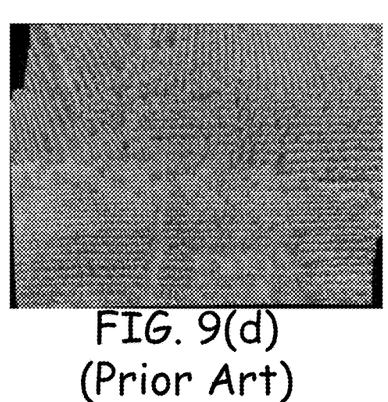
FIG. 9(d) is an example of a mosaic resulting from MicrosoftImage Composite Editor (ICE) based on the images in the dataset of FIG. 9(a).
Figure 9E:
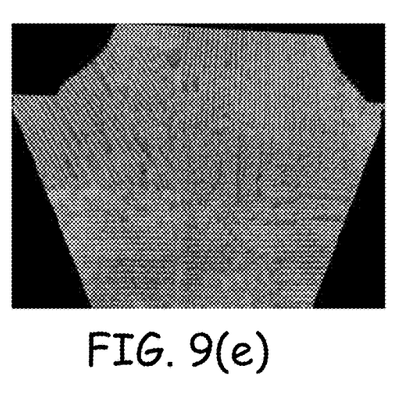
FIG. 9(e) is an example of a mosaic resulting from a present embodiment without view selection based on the images in the dataset of FIG. 9(a).
Figure 9F:
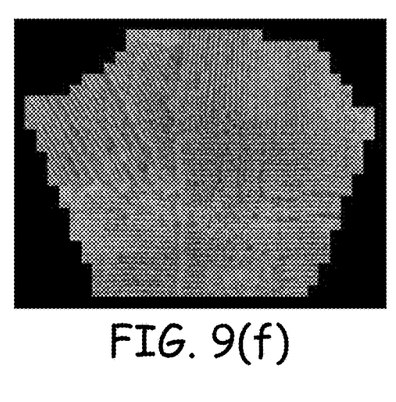
FIG. 9(f) is an example of a mosaic resulting from a present embodiment with view selection based on the images in the dataset of FIG. 9(a) and additional images from the second dataset.

FIGS. 9(a)-9(f) show the results for the corn field dataset using the same six respective methods. Specifically, FIG. 9(a) shows the mosaic resulting from the prior art baseline method, FIG. 9(b) shows the mosaic resulting from Auto-Stitch, FIG. 9(c) shows the mosaic resulting from Autopano, FIG. 9(d) shows the mosaic resulting from Microsoft ICE, FIG. 9(e) shows the mosaic resulting from step 106 without perform view selection step 108, and FIG. 9(f) shows the mosaic resulting from step 110 with view selection and best warping. Out of the 540 images in the corn field dataset, 90 images (corresponding to 30-frame intervals for the original video) were input to Autopano, Auto-Stitch and Microsoft ICE and the baseline method. The same set of 90 images were used for SfM to generate the mosaic result using the present embodiment without view selection. The additional 450 images were used to generate the mosaic result with view selection. From FIGS. 9(a), 9(b) and 9(c), it can be seen that the corn rows in the mosaics formed from the Baseline, Auto-Stitch and Autopano suffer from serious perspective distortion. FIG. 9(d) generated by Microsoft ICE has visible misalignment due to scale change of the video. Microsoft ICE automatically discards several images because it fails to align them with the final mosaic. In addition, there is motion blur in the middle of the mosaic for the mosaics in FIGS. 9(a)-9(d). FIG. 9(f) generated by our method with the best view selection eliminates motion blur and perspective distortion, creating the final mosaic with the highest resolution.

Figure 10:
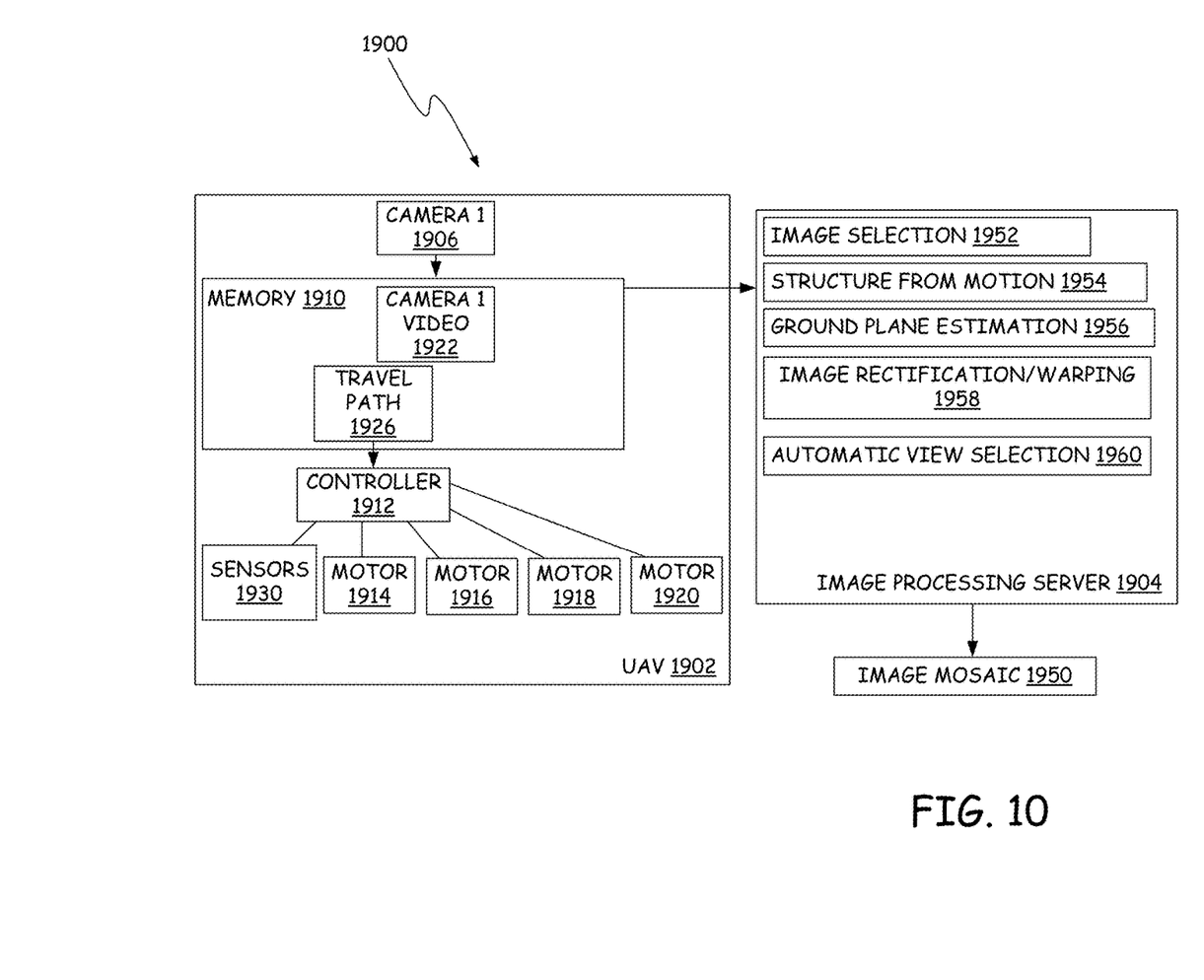
FIG. 10 provides a block diagram of a system used to implement various embodiments.

FIG. 10 provides a block diagram of a system 1900 used to implement various embodiments. System 1900 includes UAV 1902 and image processing server 1904. UAV 1902 includes first camera 1906, a memory 1910, a controller 1912 and motors, such as motors 1914, 1916, 1918 and 1920. Camera 1906 provides camera 1 video 1922, which is stored in memory 1910. A travel path 1926 is stored in memory 1910 and represents the path that UAV 1902 is to travel to capture images of a geographical area. In many embodiments, travel path 1926 is a low altitude path. Travel path 1926 is provided to controller 1912, which controls motors 1914, 1916, 1918 and 1920 to drive propellers so that UAV 1902 follows travel path 1926. One or more sensors, such as sensors 1930 provide feedback to controller 1912 as to the current position of UAV 1902 and/or the accelerations that UAV 1902 is experiencing.

Periodically or in real-time, UAV 1902 provides camera video 1922 to image processing server 1904. Video 1922 may be provided over a wireless connection, a wired connection, or a combination of both between UAV 1902 and image processing server 1904. Image processing server 1904 processes the frames of camera video 1922 to identify three-dimensional features in the frames, identify a geographical plane from the features, warp frame images to the geographical plane, and select images for blocks along the geographical plane as discussed above. To perform this processing, image processing server 1904 includes an image selection application 1952, which selects some but not all of the frames of the video for feature identification and ground plane estimation; a structure from motion application 1954 that identifies three-dimensional features in the selected images; ground plane estimation application 1956 that performs plane fitting on the three-dimensional features such that some of the three-dimensional features are identified as outliers relative to the ground plane; image rectification/warping 1958 that warps the selected images onto the estimated ground plane based on camera poses for each image determined by structure from motion application 1954; and automatic view selection 1960 that divides the ground plane into block areas and selects a best image for each block area based on distortion weighting for the image as discussed above. The resulting combination of images are then output as image mosaic 1950.

As discussed above, the techniques of the various embodiments improve the technology of generating mosaics from multiple images by providing more accurate warping and by selecting the best image for each block along an identified ground plane.

Figure 11:
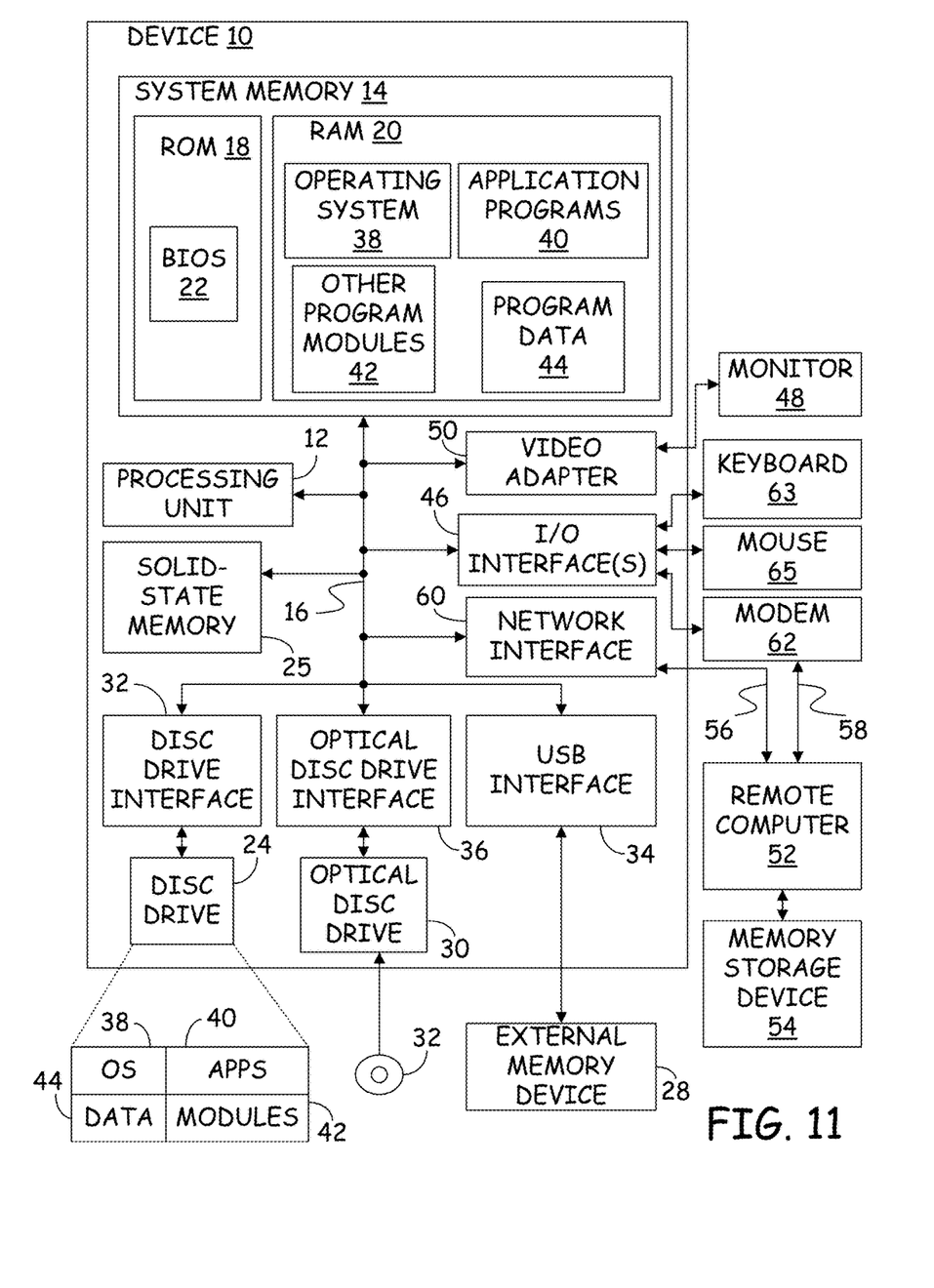
FIG. 11 is a block diagram of a computing device used to implement various embodiments.

An example of a computing device 10 that can be used as a server and/or client device in the various embodiments is shown in the block diagram of FIG. 11. For example, computing device 10 may be used to perform any of the steps described above. Computing device 10 of FIG. 11 includes a processing unit (processor) 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing any of the steps described above. Program data can include any data used in the steps described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 11. The network connections depicted in FIG. 11 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 11 are exemplary and other means for establishing a communications link between the computers, such as a wireless interface communications link, may be used.

Although the present invention has been described with reference to preferred embodiments, workers skilled in the art will recognize that changes may be made in form and detail without departing from the spirit and scope of the invention.

What is claimed is:

1. A method for generating improved image mosaics, the method comprising:
   using a set of overlapping images of a landscape to determine three-dimensional locations for a plurality of features of the landscape;
   based on the three-dimensional locations of the plurality of features, determining a three-dimensional plane of interest Random Sample Consensus without homography; and
   warping the overlapping images onto the plane of interest to form a mosaic of images;
   improving the mosaic of images by identifying an area of the mosaic captured by a plurality of images, determining a distortion metric for each of the plurality of images, and selecting the image with the best distortion metric as the image for the area, wherein the set of overlapping images of the landscape comprises a subset of a large set of overlapping images of the landscape and wherein at least one of the plurality of images that capture the area are part of the large set of overlapping images but are not part of the set of overlapping images.

2. The method of claim 1 wherein determining a three-dimensional plane of interest comprises using a plane fitting algorithm that identifies three-dimensional locations that lie within the three-dimensional plane and three-dimensional locations that are outliers relative to the three-dimensional plane.

3. The method of claim 1 wherein using a set of overlapping images to determine three-dimensional locations comprises using a Structure from Motion technique.

4. The method of claim 3 wherein the Structure from Motion technique further provides a camera pose for each image in the set of overlapping images.

5. The method of claim 1 further comprising determining a camera pose for an image that is part of the large set of overlapping images but not part of the set of overlapping images by determining a relative camera pose between the image and an image that was part of the set of overlapping images.

6. The method of claim 1 wherein determining a distortion metric comprises normalizing a number of pixels in the image dedicated to the area by a distortion in those pixels.

7. An agricultural image system comprising:
   an unmanned aerial vehicle having mounted thereon a camera configured to capture a set of captured images of a geographical area;
   a processor, forming a mosaic from the set of captured images through steps comprising:
   selecting a subset of the set of captured images;
   using the subset of images to identify geographical features of the geographical area;
   selecting a plane based on the geographical features; and
   warping the subset of images onto the selected plane instead of an image to form a mosaic.

8. The system of claim 7 wherein the processor performs further steps comprising:
   dividing the mosaic into blocks; and
   for each block, identifying images in the set of captured images that include one pixel for the block and selecting one of the identified images as the image for the block.

9. The system of claim 8 wherein selecting one of the identified images comprises determining a quality measure for each identified image and selecting the identified image with the best quality measure.

10. The system of claim 9 wherein the quality of measure comprises a distortion level of the pixels assigned to the block.

11. The system of claim 7 wherein selecting a plane based on the geographical features comprises fitting a plane to the geographical features such that at least one geographical feature is considered an outlier.

12. The system of claim 7 wherein identifying geographical features comprises using structure from motion to identify the geographical features and camera poses for each image in the subset of images.

13. The system of claim 7 wherein the set of captured images is captured at a relatively low altitude.

14. A method of constructing a mosaic comprising:
   defining a geographic area by selecting initial images for a mosaic;
   dividing the geographical area into block areas; and
   for each block area, identifying a plurality of images that contain pixels covering the block area, evaluating each image in the plurality of images, and selecting one of the plurality of images as the image for the block area based on the evaluations to thereby form an improved mosaic wherein evaluating each image comprises identifying the pixels in the image that correspond to the block area, determining a displacement of each identified pixel based on the location of the pixel in the image, and using the displacements of the pixels to form a quality measure for the image relative to the block area.

15. The method of claim 14 wherein defining the geographical area comprises:
   using the initial images to identify three-dimensional features on the geographical area;
   using the three-dimensional features to identify a plane for the geographical area; and
   rectifying the initial images onto the plane.

16. The method of claim 15 wherein identifying the plane comprises performing plane fitting such that at least one three-dimensional feature is an outlier to the plane.

17. The method of claim 16 wherein during the step of identifying three-dimensional features on the geographical area, poses for cameras of the initial images are determined.

* * * * *